US012638465B2

(12) United States Patent
Zhang et al.

(10) Patent No.: US 12,638,465 B2
(45) Date of Patent: May 26, 2026

(54) TEST TUBE RACK DISPATCHING METHOD, ANALYSIS SYSTEM AND TEST TUBE RACK

(71) Applicant: Shenzhen Mindray Bio-Medical Electronics Co., Ltd., Shenzhen (CN)

(72) Inventors: Junwei Zhang, Shenzhen (CN); Xuerong Li, Shenzhen (CN); Changyin Yan, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 787 days.

(21) Appl. No.: 17/357,511

(22) Filed: Jun. 24, 2021

(65) Prior Publication Data

US 2021/0318349 A1     Oct. 14, 2021

Related U.S. Application Data

(63) Continuation of application No. PCT/CN2018/124361, filed on Dec. 27, 2018.

(51) Int. Cl.
*G01N 35/04* (2006.01)
*G01N 35/00* (2006.01)
*G01N 35/10* (2006.01)

(52) U.S. Cl.
CPC ....... *G01N 35/04* (2013.01); *G01N 35/00732* (2013.01); *G01N 2035/00752* (2013.01);
(Continued)

(58) Field of Classification Search
CPC ............. G01N 35/04; G01N 35/00732; G01N 2035/00752; G01N 2035/00801;
(Continued)

(56) References Cited

U.S. PATENT DOCUMENTS

| | | | |
|---|---|---|---|
| 5,699,794 A | 12/1997 | Fleck | |
| 2005/0036907 A1* | 2/2005 | Shoji ................ | G01N 35/00732 |
| | | | 422/400 |

(Continued)

FOREIGN PATENT DOCUMENTS

| | | |
|---|---|---|
| CN | 101146715 A | 3/2008 |
| CN | 101848766 A | 9/2010 |

(Continued)

OTHER PUBLICATIONS

Zheng Shan-luan et al., "Development and application of bar code management system to hematology analyzer", Chinese Medical Equipment Journal. vol. 28 No. 10 Oct. 2007, pp. 1-2.

*Primary Examiner* — P. Kathryn Wright
(74) *Attorney, Agent, or Firm* — Syncoda LLC; Feng Ma

(57) ABSTRACT

A test tube rack dispatching method, a pipeline analysis system and a test tube rack. Said method is applied to a pipeline analysis system. The pipeline system comprises a sample conveying mechanism, at least two test devices and at least two test platforms corresponding to the at least two test devices, the sampling mechanism being connected to the at least two test platforms. Said method comprises: scanning a readable and writable label of a test tube rack placed in the pipeline system, so as to read test mode information corresponding to the test tube rack; and dispatching, by the sample conveying mechanism, the test tube rack to a test platform corresponding to the test mode information, so as to test samples on the test tube rack by a test device corresponding to the test platform.

20 Claims, 3 Drawing Sheets

(52) U.S. Cl.
CPC .............. *G01N 2035/00801* (2013.01); *G01N 2035/0091* (2013.01); *G01N 2035/0465* (2013.01); *G01N 2035/0494* (2013.01)

(58) Field of Classification Search
CPC ... G01N 2035/0091; G01N 2035/0465; G01N 2035/0494; G01N 35/0092; G01N 2035/00782; G01N 2035/00821; G01N 2035/0094; G01N 2035/0412
See application file for complete search history.

(56) References Cited

U.S. PATENT DOCUMENTS

| | | | | |
|---|---|---|---|---|
| 2006/0213964 | A1 | 9/2006 | Excoffier et al. | |
| 2009/0220379 | A1* | 9/2009 | Wakamiya | G01N 35/025 |
| | | | | 422/65 |
| 2011/0158851 | A1* | 6/2011 | Kitagawa | G01N 35/04 |
| | | | | 422/67 |
| 2013/0202486 | A1* | 8/2013 | Onizawa | G01N 1/18 |
| | | | | 422/65 |
| 2014/0109527 | A1* | 4/2014 | Burri | G01N 35/00 |
| | | | | 422/65 |
| 2015/0241457 | A1 | 8/2015 | Miller | |
| 2016/0124010 | A1* | 5/2016 | Makino | G01N 35/1065 |
| | | | | 422/65 |
| 2016/0328588 | A1* | 11/2016 | Hagen | G06K 7/10732 |
| 2020/0319219 | A1* | 10/2020 | Vansickler | G01N 35/0092 |

FOREIGN PATENT DOCUMENTS

| | | | | |
|---|---|---|---|---|
| CN | 102741688 A | 10/2012 | | |
| CN | 102906571 A | 1/2013 | | |
| CN | 103250056 A | 8/2013 | | |
| CN | 103364573 A | 10/2013 | | |
| CN | 103787016 A | 5/2014 | | |
| CN | 203929791 U | 11/2014 | | |
| CN | 107300624 A | 10/2017 | | |
| CN | 108414777 A | 8/2018 | | |
| CN | 108562758 A | 9/2018 | | |
| CN | 108738348 A | 11/2018 | | |
| EP | 0606121 A1 | 7/1994 | | |
| EP | 1052513 A1 | 11/2000 | | |
| JP | 2006058219 A | 3/2006 | | |
| WO | WO-2017143182 A2 * | 8/2017 | ............. | G16H 10/40 |

* cited by examiner

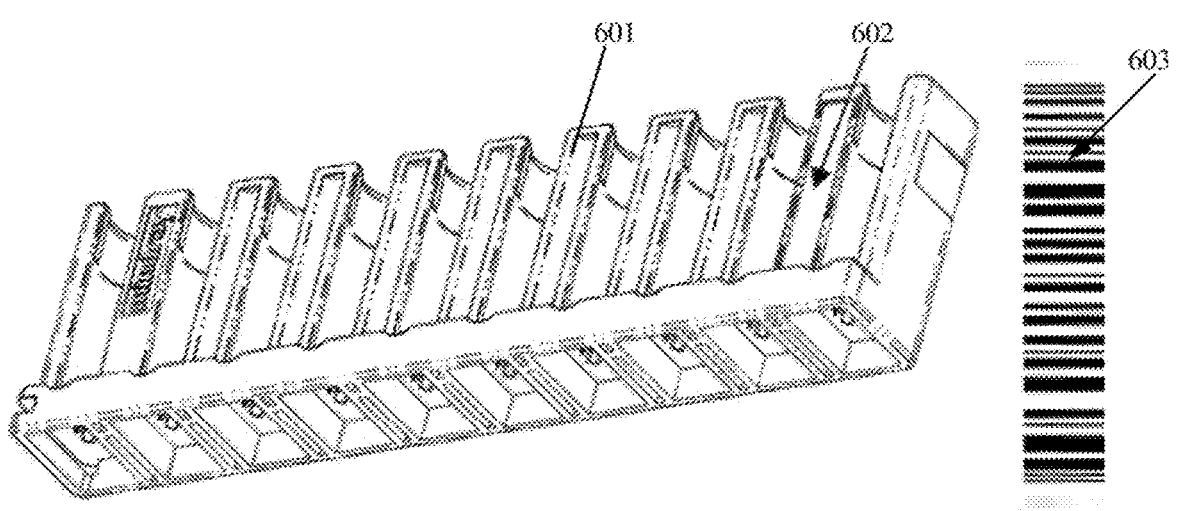
*FIG. 6*
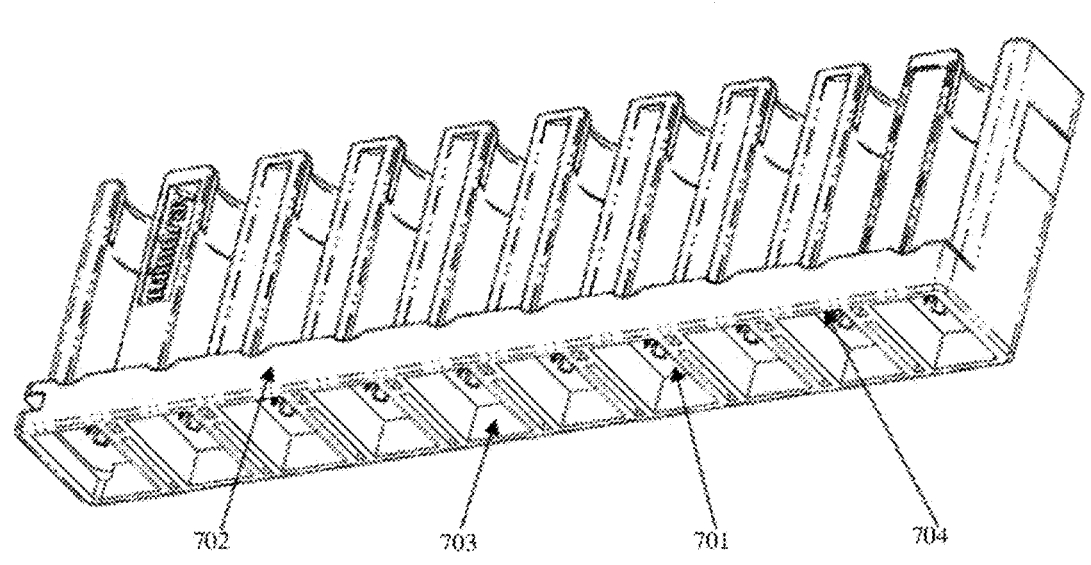
*FIG. 7*
| bit | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| Value | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
*FIG. 8*

TEST TUBE RACK DISPATCHING METHOD, ANALYSIS SYSTEM AND TEST TUBE RACK

CROSS-REFERENCE TO RELATED APPLICATIONS

This application is a continuation of International Application No. PCT/CN2018/124361, filed Dec. 27, 2018, the content of which is incorporated herein by reference.

TECHNICAL FIELD

This application relates to pipeline system technology including, but not limited to, a test tube rack dispatching method, an analysis system, and a test tube rack.

BACKGROUND

A test tube rack is a carrier that carries sample containers, and the carrier can carry multiple sample containers at one time. The test tube rack is dispatched, as a whole, in a pipeline system. Therefore, in the related art, each test tube rack has a bar code, and the pipeline system determines, by identifying the code value of the bar code, which item is to perform for the test tube rack and how to dispatch the test tube rack.

However, content information carried by the bar code is limited, such as a test tube rack sequence number, a test tube rack type, and other information, and the bar code cannot carry more information. After the test tube rack enters the pipeline system, the pipeline system reads the information carried by the bar code of the test tube rack and consults, according to the information carried by the bar code, information for dispatching the test tube rack. Therefore, the test tube rack dispatching has strong dependence on the bar code. However, the bar code is line-shaped and is easy to be contaminated, which results in reduced identification rate and even causes an error code. This causes delayed transfer or wrong delivery of the test tube rack, reducing the conveying efficiency of the pipeline system.

SUMMARY

Embodiments of the disclosure provide a test tube rack dispatching method, an analysis system and a test tube rack, which improve the conveying efficiency of the analysis system.

An embodiment of the disclosure provides a test tube rack dispatching method applied to an analysis system. The analysis system comprises a sample conveying mechanism, at least two test devices, and at least two test platforms corresponding to the at least two test devices, the sample conveying mechanism being connected to the at least two test platforms. The method comprises:

scanning a readable and writable label of a test tube rack placed in the analysis system, so as to read test mode information corresponding to the test tube rack; and dispatching, by the sample conveying mechanism, the test tube rack to the test platform corresponding to the test mode information, so as to test samples on the test tube rack by the test device corresponding to the test platform.

An embodiment of the disclosure provides an analysis system, comprising at least two test devices, at least two test platforms corresponding to the at least two test devices, a sample conveying mechanism, and a first scanning mechanism, the sample conveying mechanism being connected to the at least two test platforms; wherein the first scanning mechanism is configured to scan a readable and writable label of a test tube rack placed in the analysis system so as to read test mode information corresponding to the test tube rack; and the sample conveying mechanism is configured to dispatch the test tube rack to the test platform corresponding to the test mode information so as to test samples on the test tube rack by the test device corresponding to the test platform.

An embodiment of the disclosure provides a test tube rack, comprising a test tube rack body, wherein the test tube rack body is provided with a readable and writable label;

the test tube rack body is configured to hold test containers carrying samples;

the readable and writable label is configured to store test mode information; and the test mode information is used by an analysis system where the test tube rack is located to dispatch the test tube rack to a test device corresponding to the test mode information so as to test the samples on the test tube rack.

In the embodiments of the disclosure, the label on the test tube rack is a readable and writable label which can be read and written for information. When the test tube rack is to be dispatched, test mode information written in the readable label on the test tube rack is read, and the conveying process of the test tube rack is directly dispatched according to the read test mode information, so as to dispatch the test tube rack based on the information carried by the test tube rack itself, thereby improving the conveying efficiency of the analysis system.

BRIEF DESCRIPTION OF THE DRAWINGS

FIG. 6 is a schematic diagram of an adhered position of a bar code provided by an embodiment of the disclosure;

FIG. 7 is a schematic diagram of a recess body of a test tube rack provided by an embodiment of the disclosure; and FIG. 8 is a structural schematic diagram of test tube rack information provided by an embodiment of the disclosure.

DETAILED DESCRIPTION

The disclosure will be further described below in detail in conjunction with the accompanying drawings and the embodiments. It should be appreciated that the embodiments provided herein are merely intended to explain the disclosure and are not intended to limit the disclosure. In addition, the embodiments provided below are some embodiments for implementing the disclosure, but not all embodiments for implementing the disclosure. In the case of no conflict, the technical solutions recorded in the embodiments of the disclosure may be implemented in any combination.

In various embodiments of the disclosure, an analysis system comprises a sample conveying mechanism, at least two test devices, and at least two test platforms corresponding to the at least two test devices, and the sample conveying mechanism is connected to the at least two test platforms, wherein a readable and writable label of a test tube rack placed in the analysis system is scanned, so as to read test mode information corresponding to the test tube rack; and the test tube rack is dispatched, by the sample conveying mechanism, to the test platform corresponding to the test mode information, so as to test samples on the test tube rack by the test device corresponding to the test platform.

Figure 1:
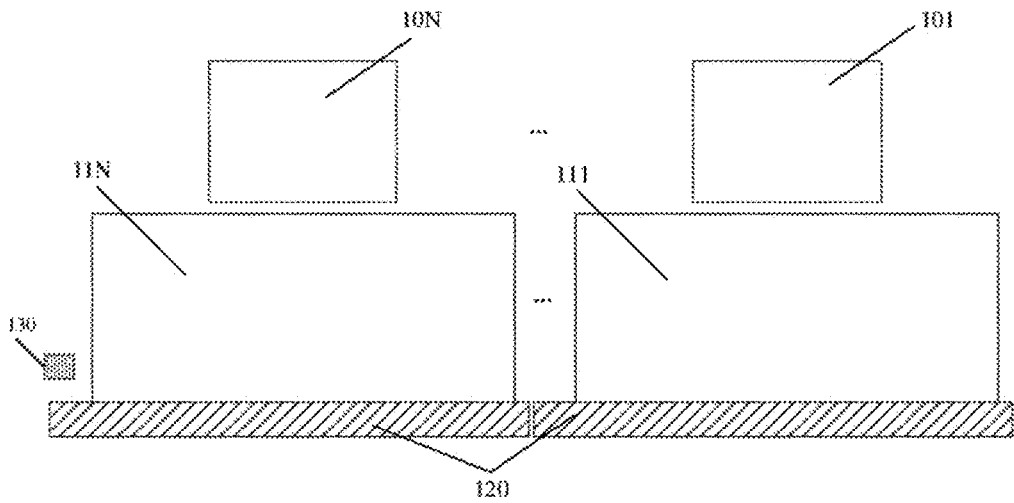
FIG. 1 is a schematic architecture diagram of an analysis system provided by an embodiment of the disclosure.

An embodiment of the disclosure provides a test tube rack dispatching method applied to an analysis system, as shown in FIG. 1, the analysis system comprising a sample conveying mechanism 120, test devices 101 to 10N, test platforms 111 to 11N respectively corresponding to the test devices 101 to 10N, and a first scanning mechanism 130, the sample conveying mechanism 120 being connected to the test platforms 111 to 11N, where N is greater than 2.

The test devices 101 to 10N are configured to test samples on the test tube rack. Different test devices can perform different test items. The test devices may include a slide smear machine, a C reactive protein (CRP) tester, a glyco-hemoglobin analyzer, a blood routine analysis instrument, a specific protein analyzer, a slide reader instrument, a flow cytometer instrument, etc. Each type of test device may include one or more test devices. Multiple test tubes, slides and other test containers may be placed on the test tube rack, and different samples are placed in different test containers.

When the analysis system tests a sample on the test tube rack, the first scanning mechanism 130 reads test mode information written in the readable and writable label of the test tube rack, the test tube rack is dispatched to the test platform corresponding to the test mode information by the sample conveying mechanism 120, and the sample on the test tube rack is tested by the test devices. One test tube rack may be transferred to all the test devices in the analysis system, and the test tube rack is delivered out of the analysis system, after the samples on the test tube rack are tested by all the test devices. Alternatively, one test tube rack may be transferred to some of the test devices in the analysis system, and after the samples on the test tube rack are tested by the some test devices, the test tube rack is delivered out of the analysis system.

Of course, the embodiments of the disclosure are not limited to the implementation of method and hardware, and there may be multiple implementation manners, such as providing a storage medium (storing programs or instructions for executing the test tube rack dispatching method provided by an embodiment of the disclosure).

Figure 2:
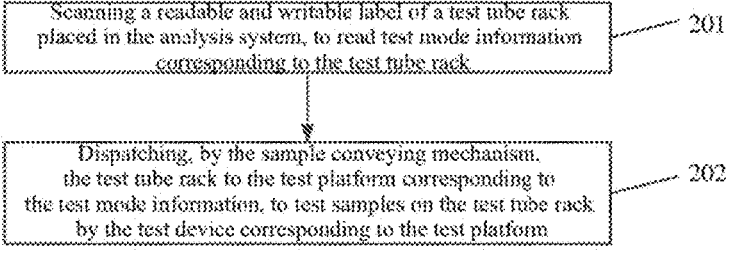
FIG. 2 is a schematic flowchart of a test tube rack dispatching method provided by an embodiment of the disclosure.

FIG. 2 is a schematic flowchart of implementing a test tube rack dispatching method provided by an embodiment of the disclosure, as shown in FIG. 2, the method comprising the following steps.

At S201, a readable and writable label of a test tube rack placed in the analysis system is scanned, so as to read test mode information corresponding to the test tube rack.

A readable and writable label, from which data can be read and to which date can be written, is fixed on a test tube rack body of the test tube rack. The readable and writable label may be an electronic tag, such as a radio frequency identification (RFID) tag. The readable and writable label internally stores data by a memory. In addition to a read-only memory (ROM), a random access memory (RAM) and a buffer memory, the memory in the readable and writable label further includes an inactive programmable memory which has, in addition to the function of storing data, the function of allowing data to be written in multiple times under appropriate conditions.

Here, the data in the readable and writable label of the test tube rack may include test tube rack information, such as test tube rack sequence number, test tube rack type information, and test mode information. The test tube rack sequence number is the test tube rack ID configured to identify a test tube rack, so as to distinguish different test tube racks. The test tube rack type information characterizes the test tube rack type of a test tube rack. The test tube rack type may include an ordinary test tube rack, a test tube rack for reticulocyte (RET) count, a test tube rack for slide smear, a test tube rack for C reactive protein (CRP), a test tube rack for CPR quality control, a test tube rack for CPR calibration, etc. The test mode information characterizes test items that need to be tested for samples on the test tube rack. The test items include CPR, glycohemoglobin analysis, slide smear, blood routine test, blood routine retest, etc.

Based on whether the test mode information is associated with the test tube rack type, there are two types, i.e., a specific type and a non-specific type, for a test tube rack. For a test tube rack of a specific type, the test mode information is associated with the test tube rack type, for example, the test item corresponding to a CRP test tube rack is CRP, the test item corresponding to a glycohemoglobin test tube rack is glycohemoglobin analysis, and the test item corresponding to a blood routine test tube rack is blood routine test. For a test tube rack of a non-specific type, there is no association between the test mode information and the test tube rack type, for example, the test item corresponding to an ordinary test tube rack may be either CRP or glycohemoglobin analysis, and may also be blood routine test. For a test tube rack of a non-specific type, the corresponding test item may be set by a user or determined according to test items of the samples on the test tube rack.

The first scanning mechanism scans the readable and writable label of the test tube rack placed on the analysis system so as to read the test mode information corresponding to the test tube rack, and the analysis system determines, according to the test mode information read by the first scanning label, the test item to be tested of the test tube rack where the readable and writable label is located.

The first scanning mechanism may comprise one or more scanners which scan the readable and writable label so as to read the test mode information from the readable and writable label.

When the first scanning mechanism comprises one scanner, the scanner may be arranged at an initial position where the test tube rack enters the analysis system, so that when the test tube rack enters the analysis system, the test mode information of the test tube rack that enters the analysis system can be read.

When the first scanning mechanism comprises multiple scanners, arrangement positions of the scanners may include positions on the test platform, on the sample conveying mechanism, at the junction of the test platform and the sample conveying mechanism, etc. The embodiments of the disclosure do not limit the positions where the scanners are arranged.

At S202, the test tube rack is dispatched, by the sample conveying mechanism, to the test platform corresponding to the test mode information, so as to test samples on the test tube rack by the test device corresponding to the test platform.

After the first scanning mechanism reads the test mode information of the test tube rack that enters the analysis system, the sample conveying mechanism dispatches the test tube rack to the test platform corresponding to the test mode information, so as to test samples on the test tube rack by the test device corresponding to the test platform where the test tube rack is located.

For example, the test devices in the analysis system include a CPR analyzer, a glycohemoglobin analyzer, a slide smear analyzer, and a blood routine analyzer; and the corresponding test items are CPR test, glycohemoglobin analysis, slide smear, and blood routine test, respectively. When the read test mode information of the test tube rack is the test item CPR, the test tube rack is transferred to the test platform corresponding to CPR test by the sample conveying mechanism, so as to perform CPR test on samples on the test tube rack by the CPR analyzer.

For another example, the test devices in the analysis system include a CPR analyzer, a glycohemoglobin analyzer, a slide smear analyzer, and a blood routine analyzer; and the corresponding test items are CPR test, glycohemoglobin analysis, slide smear, and blood routine test, respectively. When the read test mode information of the test tube rack includes the blood routine test, CPR test, and slide smear, the test tube rack is respectively transferred to the test platforms corresponding to the blood routine test, CPR test and slide smear by the sample conveying mechanism, so as to perform the blood routine test, CPR test and slide smear test on samples on the test tube rack by the blood routine analyzer, the CPR analyzer and the slide smear analyzer.

In an optional embodiment, the test mode information comprises at least two test items, and the step of dispatching the test tube rack to the test platform corresponding to the test mode information so as to test samples on the test tube rack by the test device corresponding to the test platform comprises: ordering the at least two test items according to a priority corresponding to each test item; and dispatching the test tube rack to the test platforms corresponding to the at least two test items in sequence according to the priority order of the at least two test items.

Here, the priority corresponding to each test item is determined according to a priority list, the at least two test items are ordered according to the priority of each test item, and the test tube rack is transferred, by the sample conveying mechanism, to the test platforms corresponding to the test items in sequence according to the ordering result. The priority list includes the priority corresponding to each test item involved in the analysis system.

For example, when the read test mode information of the test tube rack includes blood routine test, CPR test and slide smear, the priority corresponding to the blood routine test is priority 3, the priority corresponding to the CRP test is priority 1, the priority corresponding to the slide smear is priority 2, and the priority order from high to low is priority 1, priority 2, and priority 3. In this case, the priority order of the test items from high to low is the CRP test, the slide smear and the blood routine test, and then the test tube rack is transferred to the test platforms corresponding to the CRP test, slide smear and blood routine test in sequence by the sample conveying mechanism, so as to test the samples on the test tube rack in sequence by the blood routine analyzer, the CPR analyzer and the slide smear analyzer according to the test sequence of the routine test, CPR test and slide smear.

In practical applications, the priority corresponding to each test item included in the priority list may be either set according to actual needs, or learned according to the test history of the test items in the analysis system, and the embodiments of the disclosure do not limit the method for determining the priority corresponding to each test item and do not limit the priority corresponding to each test item.

In the embodiments of the disclosure, the label on the test tube rack is a readable and writable label from which data can be read or into which data can be written. When the test tube rack is to be dispatched, the first scanning mechanism in the analysis system reads the test mode information on the test tube rack that is written to the readable label, the conveying process of the test tube rack is directly dispatched according to the read test mode information, so as to dispatch the test tube rack based on the test mode information carried by the test tube rack itself, thereby improving the conveying efficiency of the analysis system.

In practical applications, the analysis system comprises a control device, which is in data connection with the sample conveying mechanism and controls the sample conveying mechanism to transfer the test tube rack. The sample conveying mechanism comprises at least two tracks, and different tracks correspond to different test platforms. The control device controls the transfer of the sample conveying mechanism. When the sample conveying mechanism transfers the test tube rack to the test platform corresponding to the test mode information, the test tube rack is transferred to the track corresponding to the test mode, and an actuation claw on the track pushes the test tube rack on the track to the corresponding test platform. For example, when the sample conveying mechanism needs to transfer the test tube rack to the corresponding test platform for which the test mode is blood routine test, the test tube rack is transferred to the track corresponding to the blood routine test, and the actuation claw on the track corresponding to the blood routine test pushes the test tube rack to the test platform corresponding to the blood routine test.

In an optional embodiment, the test tube rack is further provided with an information code label, and the method further comprises: scanning the readable and writable label of the test tube rack, so as to obtain a test tube rack sequence number in the readable and writable label; scanning the information code label of the test tube rack, so as to obtain a test tube rack sequence number in the information code label; and outputting prompt information if the test tube rack sequence number in the information code label is different from the test tube rack sequence number in the readable and writable label.

After the test tube rack enters the analysis system, the first scanning mechanism scans the readable and writable label on the test tube rack, so as to obtain the test tube rack sequence number in the readable and writable label. A bar code scanning mechanism scans the information code label of the test tube rack, so as to obtain the test tube rack sequence number in the information code label. The test tube rack sequence number in the readable and writable label is compared with the test tube rack sequence number identified by the information code label. If the two are inconsistent, it means that one of the test tube rack sequence numbers in the information code label and in the readable and writable label is wrong, then prompt information can be generated based on the test tube rack sequence number in the readable and writable label and the test tube rack sequence number identified by the information code label, and a prompt apparatus outputs the prompt information. Here, the prompt apparatus outputs the prompt information in the manner of voice prompt, text prompt, etc. The information code on the information code label may be a bar code, a two-dimensional code, and other identification code.

In practical applications, the prompt apparatus may be the same physical apparatus as the control device, and the control device is provided with a display, on which the prompt information is displayed to prompt a user to check the test tube rack.

Figure 3:
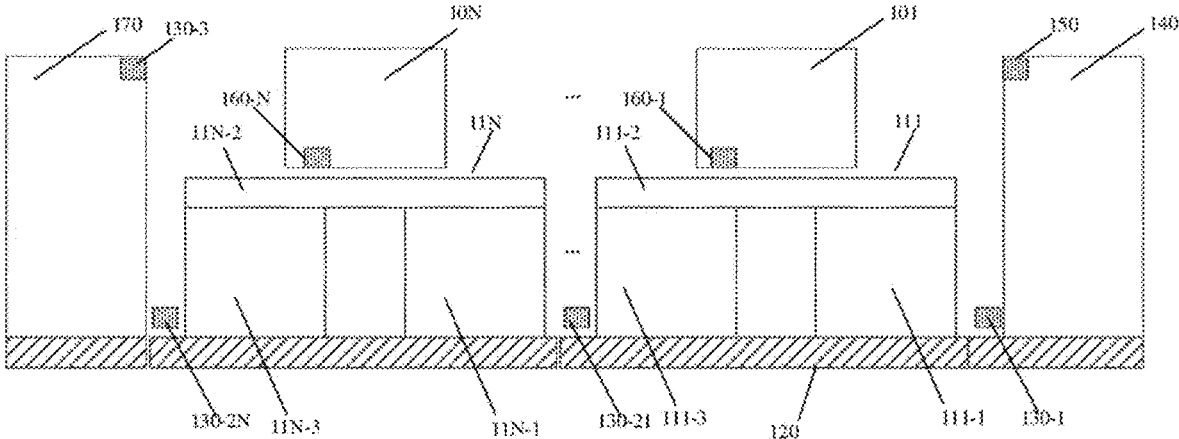
FIG. 3 is a schematic architecture diagram of an analysis system provided by an embodiment of the disclosure.

Based on the analysis system shown in FIG. 1, as shown in FIG. 3, the analysis system may further comprise a loading platform 140 configured to place the test tube rack. The loading platform 140 is provided with a second scanning mechanism 150. The first scanning mechanism comprises a first scanner 130-1 arranged on the loading platform 140.

In practical applications, the second scanning mechanism 150 and the first scanner 130-1 may be the same scanner, which can read data from and write data to the readable and writable label of the test tube rack.

Accordingly, S202 may include: scanning the readable and writable label of the test tube rack located on the loading platform, so to read the test mode information corresponding to the test tube rack; and transferring the test tube rack from the loading platform to the test platform corresponding to the test mode information by the sample conveying mechanism.

The first scanner 130-1 scan the readable and writable label of the test tube rack placed on the loading platform 140, so as to read the test mode information corresponding to the test tube rack; and the sample conveying mechanism 120 transfers the test tube rack from the loading platform 140 to the test platform corresponding to the test mode information.

The loading platform 140 pushes the test tube rack to the sample conveying mechanism 120, and the sample conveying mechanism 120 may record, only according to the test mode information, the first test item to be tested currently and transfer the test tube rack to the test platform corresponding to the first test item; or may record the test sequence among all the test items and transfer, according to the test sequence among the test items, the test tube rack in sequence to the test platform corresponding to each the test item.

Based on the analysis system shown in FIG. 3, the test tube rack dispatching method provided by the embodiments of the disclosure further comprises:

determining the test mode information corresponding to the test tube rack and writing the test mode information to the readable and writable label of the test tube rack located on the loading platform.

The second scanning mechanism 150 writes the test mode information corresponding to the test tube rack to the readable and writable label of the test tube rack.

After the test tube rack enters the analysis system from the outside of the analysis system, the second scanning mechanism 150 scans the readable and writable label of the test tube rack on the loading platform 140, so as to obtain and send the test tube rack sequence number of the test tube rack to the control device of the analysis system. The control device of the analysis system obtains the test mode information corresponding to the test tube rack according to the test tube rack sequence number of the test tube rack, and sends the obtained test mode information to the second scanning mechanism 150, and the second scanning mechanism 150 writes the test mode information to the readable and writable label of the test tube rack.

In practical applications, when reading the test tube rack sequence number of the test tube rack, the control device may determine whether the test tube rack type information in the data read from the readable and writable label of the test tube rack is of a specific type. If it is a specific type, the second scanning mechanism 150 writes the test item corresponding to the specific type to the readable and writable label of the test tube rack; and if it is a non-specific type, the control device obtains the test mode information of the samples on the test tube rack, and the second scanning mechanism writes the obtained test mode information to the readable and writable label of the test tube rack.

In an optional embodiment, the step of determining the test mode information corresponding to the test tube rack comprises:

receiving the test mode information corresponding to the test tube rack that is inputted by an input device; or determining sample serial numbers of the samples on the test tube rack and obtaining test mode information corresponding to the sample serial numbers.

Here, when the test tube rack type is a non-specific type, the method of the control device obtaining the test mode information of the test tube rack may at least comprise one of the following two acquisition methods.

In a first acquisition method, the control device obtains, according to the test tube rack sequence number of the test tube rack, the test mode information corresponding to the test tube rack sequence number that is inputted by an input device.

Here, an input interface may be provided in the input device, the test tube rack sequence number of the test tube rack is displayed in the input interface, and an input port is provided in the input interface to receive the input operation of the user for the setting of the test item of the test tube rack, and when the user's input operation is received, the test mode information corresponding to the test tube rack is determined according to the test item inputted by the user's input operation.

In practical applications, the control device and the input device are the same physical entity, and the control device provides a human-machine interface between the analysis system and an operator by means of a keyboard, a mouse, a touch screen, etc., as the input device to receive the operator's input information.

In a second acquisition method, the control device obtains the sample serial numbers of the samples placed on the test tube rack, determines the test item of each sample according to its sample serial number, and determines the test mode information of the test tube rack according to the test items of all the samples.

Here, the second scanning mechanism 150 scans the readable and writable label on the test tube rack, or a bar code scanning mechanism arranged on the loading platform scans information code labels of test containers on the test tube rack, so as to obtain the sample serial numbers of the samples placed on the test tube rack. The control device obtains the sample serial numbers obtained by the second scanning mechanism, determines the test items corresponding to the sample serial numbers, and integrates the test items of all the samples to obtain the test mode information corresponding to the test tube rack.

For example, the sample serial numbers of the samples on the test tube rack are respectively 1-1, 1-2 and 1-3. The test item corresponding to 1-1 includes a blood routine test, and the test items corresponding to 1-2 include a glycohemoglobin test and a blood routine test. The test items corresponding to 1-2 include a CRP test, a blood routine test, a glycohemoglobin test, and a slide smear test. The test items corresponding to 1-1, 1-2 and 1-3 are integrated, and the obtained test mode information of the test tube rack includes blood routine test, glycohemoglobin test, CRP test, and slide smear.

In an optional embodiment, the readable and writable label includes at least test tube rack information. Before writing the test mode information to the readable and writable label of the test tube rack on the loading platform, the method further comprises:

clearing information from the readable and writable label of the test tube rack, except for the test tube rack information.

Here, the test tube rack information includes the test tube rack sequence number, the test tube rack type, and other information. Here, the test tube rack information may be carried in the information code of the information code label of the test tube rack at the same time.

Before the second scanning mechanism 150 writes the test mode information to the test tube rack, the data except for the test tube rack information in the test tube rack label is cleared so as to prevent the misidentification of the information of the test tube rack.

Based on the analysis system shown in FIG. 1, the analysis system further comprises a third scanning mechanism electrically connected to the first test device, and as shown in FIG. 3, when the first test device is the test device 101, the test device 101 is electrically connected to the third scanning mechanism 160-1, and when the first test device is the test device 10N, the test device 10N is electrically connected to the third scanning mechanism 160-N. In practical applications, each test device in the analysis system may be respectively electrically connected to one third scanning mechanism.

Figure 4:
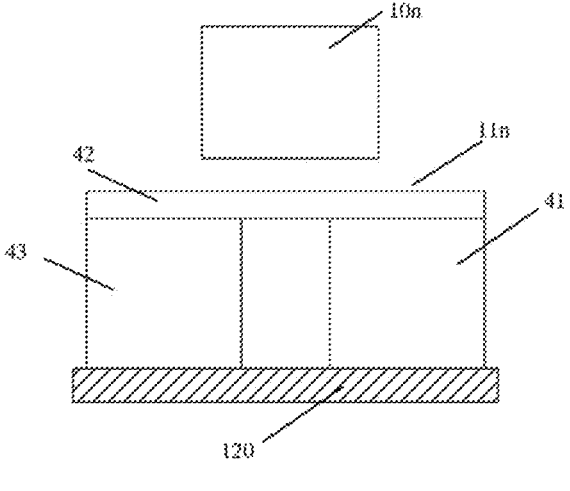
FIG. 4 is a schematic diagram of the constitution of a test platform provided by an embodiment of the disclosure.

As shown in FIG. 4, each test platform 11n of the test platforms 111-11N comprises a temporary loading storage region 41, a sample feeding track 42, and a temporary unloading storage region 43. The temporary unloading storage region 43 is connected between the sample feeding track 42 and the sample conveying mechanism 120, the temporary loading storage region 41 is connected between the sample feeding track 42 and the sample conveying mechanism 120, and the temporary loading storage region 41 and the temporary unloading storage region 43 are respectively arranged on two sides of the test device 10n.

When the sample conveying mechanism 120 delivers a test tube rack to the test platform 11n, the test tube rack is delivered to the temporary loading storage region 41, and the temporary loading storage region 41 is configured to temporarily store the test tube rack that is delivered by the sample conveying mechanism 120, so as to wait for testing by the test device. The sample feeding track 42 is configured to place a test tube rack being tested and deliver samples on the test tube rack into the test device. The temporary unloading storage region 43 is configured to temporarily store a test tube rack that has been tested but has not been delivered out of the test platform.

As shown in FIG. 3, when the first test device is the test device 101, the corresponding test platform 111 comprises a temporary loading storage region 111-1, a sample feeding track 111-2, and a temporary unloading storage region 111-3. When the first test device is the test device 10N, the corresponding test platform 11N comprises a temporary loading storage region 11N-1, a sample feeding track 11N-2, and a temporary unloading storage region 11N-3.

As shown in FIG. 3, the first scanning mechanism 130 comprises second scanners 130-21 to 130-2N respectively arranged in the temporary unloading storage regions or arranged at positions on the sample conveying mechanism corresponding to the temporary unloading storage regions, wherein the second scanner 130-21 is arranged in the temporary unloading storage region 111-1 or at a position on the sample conveying mechanism 120 corresponding to the temporary unloading storage region 111-3, and the second scanner 130-2N is arranged in the temporary unloading storage region 11N-1 or at a position on the sample conveying mechanism 120 corresponding to the temporary unloading storage region 11N-3.

Hereafter, taking an example in which the first test device is the test device 101 in FIG. 3 and the second test device is the test device 10N, the test tube rack dispatching method and the analysis system provided by the embodiments of the disclosure will be further described.

Based on the analysis system shown in FIG. 3, in an optional embodiment, when the at least two test devices at least include a first test device, and the test platform corresponding to the first test device is a first test platform. The method further comprises: delivering samples on the test tube rack placed on the first test platform into the first test device; testing the samples on the test tube rack by the first test device to obtain test data; and writing the test data to the readable and writable label of the test tube rack. Here, the first test device may be a test device corresponding to any test item in the test mode information of the test tube rack.

When the test tube rack 120 is pushed from the sample conveying mechanism to the first test platform 111, the first test platform 111 delivers the samples on the test tube rack placed on the first test platform 111 into the first test device 101, so as to test the samples on the test tube rack by the first test device 101. Here, test containers containing the samples on the test tube rack can be pushed to a sample aspiration position by the first test platform 111, and the samples in the test containers are aspirated and tested by the first test device 101.

The first test device 101 is electrically connected to the third scanning mechanism 160-1, after the first test device tests the samples in the test tube rack and obtains the test data, the third scanning mechanism 160-1 scans the readable and writable label on the test tube rack, so as to write the test data to the readable and writable label of the test tube rack. Here, when the test data of the samples are written, the test data of different samples may be identified based on the sample serial numbers.

When the third scanner 160-1 writes the test data, the test data and the test item identifier corresponding to the test data maybe written at the same time, so as to identify the test data corresponding to different test items. If the first test device determines that the first test item is a retest item according to the test data, the first test item is written, by the third scanner 160-1, as a retest item, to the label of the test tube rack.

In practical applications, after the first test device obtains the test data, the first test device may directly send the test data and the corresponding test item identifier to the control device of the analysis system. Here, when it is determined, according to the test data, that the test item supported by the first test device is a retest item, the first test item is sent as a retest item to the control device.

After the first test device 101 tests the samples in the test tube rack, the following two pushing methods are performed according to whether the samples on the test tube rack are retested by the first test device 101.

First Pushing Method (not Retested by the First Test Device):

The readable and writable label of the test tube rack having tested by the first test device is scanned so as to read a remaining second test item in the test mode information of the test tube rack; and the test tube rack is transferred from the first test platform to the second test platform corresponding to the second test item by the sample conveying mechanism.

The second scanner 130-21 scans the readable and writable label of the test tube rack which has been tested by the first test device 101, so as to read whether there is a remaining second test item in the test mode information corresponding to the test tube rack, and the sample conveying mechanism transfers, according to the reading result, the test tube rack from the temporary unloading storage region to the second test platform 11N corresponding to the second test item or deliver the test tube rack out of the analysis system.

After the first test device 101 tests the samples on the test tube rack, the second scanner 130-21 reads the readable and writable label of the test tube rack that is transferred from the first test platform 111 to the sample conveying mechanism 120, and determines whether the read test mode information includes a remaining second test item; and if so, the sample conveying mechanism 120 transfers the test tube rack to the second test platform 11N corresponding to the second test item so as to test samples on the test tube rack for the second test item by the second test device 101N, and if not, the sample conveying mechanism 120 delivers the test tube rack out of the analysis system.

For example, the test items corresponding to the test tube rack include CPR test, glycohemoglobin analysis, slide smear and blood routine test. After the CPR test is completed by the CPR analyzer, if it is determined that, according to the test mode information, the remaining second test item includes glycohemoglobin analysis, slide smear and blood routine test, then the sample conveying mechanism transfers the test tube rack to one of the glycohemoglobin analyzer, the slide smear analyzer and the blood routine analyzer. The transferring sequence may be determined according to a test sequence such as a priority order. If it is determined that no remaining second test item is included according to the test mode information, the sample conveying mechanism delivers the test tube rack out of the analysis system.

In practical applications, after the test device completes the test of one test item, this test item is marked as a completed item, and then the unmarked test item in the test mode information is the remaining second test item.

The test item of the second test device 10N is referred to as the second test item, the second test device is any test device in the analysis system other than the first test device 101, and the test platform corresponding to the second test device 10N is the second test platform 11N. The test item of the first test device 101 is referred to as the first test item, and the first test item may be the same as or different from the second test item.

Here, when the remaining second test item in the label of the test tube rack includes the first test item as a retest item, the first test item is the same as the second test item. When the remaining second test item in the label of the test tube rack does not include the first test item as a retest item, the first test item is different from the second test item.

In practical applications, when the first test item is not included in the label of the test tube rack as a retest, the control device may directly control the sample conveying mechanism 120 to transfer the test tube rack to the second test device in which the second test item is the same as the first test item, so as to retest a sample on the test tube rack for the first test item by the second test device.

Second Pushing Method (Retested by the First Test Device):

The retest for the test tube rack includes the following two scenarios according to whether the sample feeding track delivers the test tube rack out of the sample feeding track.

In the first scenario, the method further comprises: determining whether the first test item corresponding to the first test device is a retest item according to the test data; if the first test item is a retest item, allowing the sample feeding track to move reversely so as to retest the sample on the test tube rack by the first test device; and if the first test item is not a retest item, delivering the test tube rack to the temporary unloading storage region.

Here, before the sample feeding track 111-2 delivers the test tube rack to the temporary unloading storage region 111-3, the first test device or the control device determines, according to the test data, that the first test item is a retest item, and then the sample feeding track 111-2 moves reversely so as to deliver the sample on the test tube rack into the first test device 101 for retesting.

In the second scenario, the method further comprises: delivering the test tube rack, which has been tested by the first test device, to the temporary unloading storage region; determining, according to the test data, that the first test item corresponding to the first test device is a retest item; and delivering the test tube rack located in the temporary unloading storage region to the sample feeding track, so as to retest the sample on the test tube rack by the first test device.

After the samples on the test tube rack are tested, the sample feeding track 111-2 delivers the test tube rack to the temporary unloading storage region 111-3, and the first test device 101 determines, according to the test data, that the first test item corresponding to the first test device 101 is a retest item; and the temporary unloading storage region 111-3 delivers the test tube rack thereon to the sample feeding track 111-2 or the sample conveying mechanism 120, so as to retest a sample on the test tube rack by the first test device 101.

When the control device or the first test device needs to test a sample on the test tube rack for the first test item again according to the test data of the first test device 101, the first test item is a retest item. Then, the temporary unloading storage region 111-3 transfers the test tube rack to the sample feeding track 111-2 of the first test platform 111, and delivers the sample on the test tube rack into the first test device 101 again, so as to retest the sample on the test tube rack by the first test device 101.

Here, the temporary unloading storage region 111-3 delivering the test tube rack to the sample feeding track 111-2 comprises the following two methods.

First Method:

If there is no other test tube rack placed on the side of the sample feeding track that is close to the test tube rack, the test tube rack located in the temporary unloading storage region is allowed to return to the sample feeding track, so as to test the sample on the test tube rack by the first test device.

In the first method, when there is no other test tube rack on the side of the sample feeding track 111-2 that is close to the test tube rack to be retested, it can be determined that, without delivering the test tube rack to be retested out of the first test platform 111, the temporary unloading storage region 111-3 enables the test tube rack to directly return to the sample feeding track 111-2, the sample feeding track 111-2 moves reversely to deliver the sample on the test tube rack into the sample aspiration position, and the first test device aspirates and tests the sample on the test tube rack.

Second Method:

If there is another test tube rack placed on the side of the sample feeding track that is close to the test tube rack, the test tube rack located in the temporary unloading storage region is delivered to the sample conveying mechanism, the test tube rack is delivered to the temporary loading storage region by the sample conveying mechanism, and the test tube rack on the temporary loading storage region is delivered to the sample feeding track, so as to test the sample on the test tube rack by the first test device.

In the second method, the temporary unloading storage region 111-3 delivers the test tube rack to the sample conveying mechanism 120; the sample conveying mechanism 120 delivers the test tube rack to the temporary loading storage region 111-1; the temporary loading storage region 111-1 delivers the test tube rack to the sample feeding track 111-2; and the sample feeding track 111-2 delivers the sample on the test tube rack into the first test device 101 for retesting.

When there is another test tube rack placed on the side of the sample feeding track 111-2 that is close to the test tube rack to be retested, it is determined that there is a test tube rack being tested or there is a further test tube rack having been tested after the test tube rack to be retested, and the temporary unloading storage region 111-3 cannot directly make the test tube rack to be retested return to the sample feeding track 111-2. Then, the temporary unloading storage region 111-3 transfers the test tube rack from the temporary unloading storage region 111-3 to the sample conveying mechanism 120, the sample conveying mechanism 120 moves reversely to transfer the test tube rack to the temporary loading storage region 111-1 of the first test platform 111, and the temporary loading storage region 111-1 delivers the test tube rack to the sample feeding track 111-2, such that after the test tube rack is delivered out from the first test platform 111, the test tube rack is delivered into the first test platform 111 again by the sample conveying mechanism 120.

In practical applications, the test tube rack to be retested may be directly delivered out from the first test platform 111 and then delivered into the first test platform 111 again, such that there is no need to determine whether there is another test tube rack placed on the side of the sample feeding track 111-2 that is close to the test tube rack.

In practical applications, when it is determined that the test item of the first test device 101 is a retest item, the test item of the first test device may be written, as a retest item, to the readable and writable label on the test tube rack by the second scanner 130-21 or the third scanning mechanism 160-1.

It should be noted that the description regarding the first test device in the embodiments of the disclosure is also applicable to the second test device.

In the embodiments of the disclosure, providing a second scanner in the temporary unloading storage region of the test platform or at the position of the sample conveying track corresponding to the temporary unloading storage can obtain the identity information of the test tube rack, determine whether there is a test tube rack that is taken away or changed in order, and can find out which test tube rack is taken away or which test tube rack is changed in order so as to avoid the case that a wrong sample rack is delivered, thereby improving the conveying efficiency of the pipeline analysis system.

In an optional embodiment, before the test tube rack is delivered out of the analysis system, the method further comprises: writing additional test mode information corresponding to an additional test item to the readable and writable label of the test tube rack; and delivering the test tube rack to a third test platform corresponding to the additional test item by the sample conveying mechanism so as to test samples on the test tube rack by a third test device corresponding to the third test platform.

The additional test mode is a test item that is not included in the test mode information. For example, after the test device corresponding to a test item A obtains test data of samples on the test tube rack, it is determined, according to the test data of the test item A, that the test result of the samples needs to be analyzed based on test data of a test item B. However, the test item B is not included in the test mode information corresponding to the test tube rack, and then the test item B is referred to as an additional test mode.

When the analysis system determines, according to the test data of the test device, that an additional test mode is needed to test a sample on the test tube rack, before the test tube rack is delivered out of the analysis system, the third scanning mechanism writes, before the test tube rack is delivered out of the analysis system, additional test mode information corresponding to the additional test item to the readable and writable label of the test tube rack, and the sample conveying mechanism delivers the test tube rack to a test platform corresponding to the additional test item, so as to test the sample on the test tube rack for the additional test item by a test device corresponding to the additional test item.

Here, the third scanning mechanism that writes the additional test mode information corresponding to the additional test item to the readable and writable label of the test tube rack is any one of the third scanning mechanisms in the analysis system. The test device corresponding to the additional test item is referred to as the third test device, and the test platform corresponding to the third test device is referred to as the third test platform. The third test device may be any test device in the analysis system other than the first test device and the second test device.

As shown in FIG. 3, the analysis system may further comprise: an unloading platform 170 configured to place the test tube rack, and a display (not shown). The first scanning mechanism 130 comprises a third scanner 130-3 arranged on the unloading platform 170.

As shown in FIG. 3, the unloading platform 170 is located in an area in the analysis system independent of the test platforms. In practical applications, for the unloading platform 170, an area that is extended from the temporary unloading storage region on the test platform may be used as the unloading platform 170.

The method further comprises: delivering the test tube rack having been tested to the unloading platform; scanning the readable and writable label of the test tube rack, so as to read the test data and the test mode information in the readable and writable label; and outputting the test data and the test mode information to a display interface.

When the samples on the test tube rack have been tested for all the test items and are to be delivered out of the analysis system, the sample conveying mechanism 120 delivers the test tube rack to the unloading platform 170. The unloading platform 170 receives the tested test tube rack conveyed by the sample conveying mechanism 120; and the third scanner 130-3 scans the readable and writable label of the test tube rack on the unloading platform 170, so as to read the test data and the test mode information in the test tube rack and send the test data and the test mode information to the display. Here, the test mode information may include the retest item and the additional test item.

Here, when the display displays the test data of the samples in the test tube rack, the test data may be displayed in a format such as a table, an image, etc., and the displayed content other than the test data may also include sample status information, such as sample critical degree, which can be specifically set according to actual needs.

It should be noted that the display may be a display on the control device, that is, the control device can present the test results of the samples on the test tube rack to a user while receiving a user input operation.

In the test tube rack dispatching method provided by the embodiments of the disclosure, by scanning the test tube rack using the third scanner, the status of all the samples on the rack can be obtained and presented to the user, such that the user can conveniently and quickly find out a sample with a certain characteristic.

An embodiment of the disclosure further provides a test tube rack, comprising a test tube rack body, wherein the test tube rack body is provided with a readable and writable label;

the test tube rack body is configured to hold test containers that carry samples;

the readable and writable label is configured to store test mode information; and the test mode information is used by an analysis system where the test tube rack is located to dispatch the test tube rack to a test device corresponding to the test mode information so as to test the samples on the test tube rack.

A readable and writable label, from which data can be read and to which data can be written, is fixed on the test tube rack body. The readable and writable label maybe an electronic tag such as a radio frequency identification (RFID) tag. The readable and writable label internally stores data by a memory. In addition to a read-only memory (ROM), a random access memory (RAM) and a buffer memory, the memory in the readable and writable label further includes an inactive programmable memory which has, in addition to the function of storing data, the function of allowing data to be written in multiple times under appropriate conditions.

In an optional embodiment, the test tube rack body is provided with an information code label, and the information code label is configured to display information code.

Then, the test tube rack is provided with both the readable and writable label and the information code label. The information code may be a bar code, a two-dimensional code, and other identification code.

In an optional embodiment, the readable and writable label and the information code label are respectively arranged at different positions on the test tube rack body.

In an optional embodiment, the readable and writable label and the information code label are arranged at the same position on the test tube rack body, and the information code label is attached on the readable and writable label.

The readable and writable label and the information code label may be respectively arranged at different positions on the test tube rack body or may also be arranged at the same position of the test tube rack body.

When the readable and writable label and the information code label are arranged at the same position, the information code label is attached to the readable and writable label, and the same position of the two labels may be arranged based on the position of the information code scanning mechanism. Then, without affecting the position of the information code scanning mechanism in the analysis system, the information carried by the test tube rack is not limited by the information code such as a bar code and a two-dimensional code.

In an optional embodiment, the test tube rack body is provided with a recess, and the readable and writable label is attached in the recess. The readable and writable label has a certain thickness, thus, when the readable and writable label is arranged in the recess, it can ensure that the external structure of the test tube rack will not be affected by the readable and writable label.

In an optional embodiment, a concave portion of the recess match a convex portion of the readable and writable label. The readable and writable label is a circuit board with a memory and a controller. Therefore, the surface of the readable and writable label has a protruded convex portion, such that the readable and writable label has an uneven surface. When the recess is provided, according to the position of the convex portion of the readable and writable label, the concave portion may be arranged in the recess corresponding to the size and position of the convex portion, and the concave portion is arranged in the bottom face of the recess. When fixing the readable and writable label, the face of the readable and writable label that is provided with the convex portion is attached to the bottom face of the recess, such that the readable and writable label has a flat appearance.

In an optional embodiment, the convex portion of the readable and writable label is located in an area outside an attachment area for attaching the information code label. Here, when providing the readable and writable label, the convex portion may be arranged on two sides of the readable and writable label, leaving part of the area in the middle for attaching the information code label. In this way, the information code attached to the readable and writable label has a flat surface, thereby preventing reduction in the identification rate of the information code.

In an optional embodiment, test tube rack data stored in the readable and writable label comprises a test tube rack sequence number; and the content of the information code displayed by the information code label is the test tube rack sequence number, such that the test tube rack sequence numbers recognized by detecting the readable and writable label and by detecting the information code label are consistent, thereby reducing the complexity of management for the test tube rack.

Hereafter, the test tube rack provided by the embodiments of the disclosure will be further illustrated taking an example in which the readable and writable label is an RFID tag.

In an embodiment of the disclosure, an RFID tag is fixed on the test tube rack, and the RFID tag on the test tube rack is recognized by RFID detection technique. The RFID detection technique is composed of an RFID card reader and an RFID tag. The RFID card reader can read data in the RFID tag in a non-contact manner by using a magnetic field or write data into the RFID tag. The RFID card reader may be arranged in the analysis system, and the RFID tag is fixed on the test tube rack.

Figure 5:
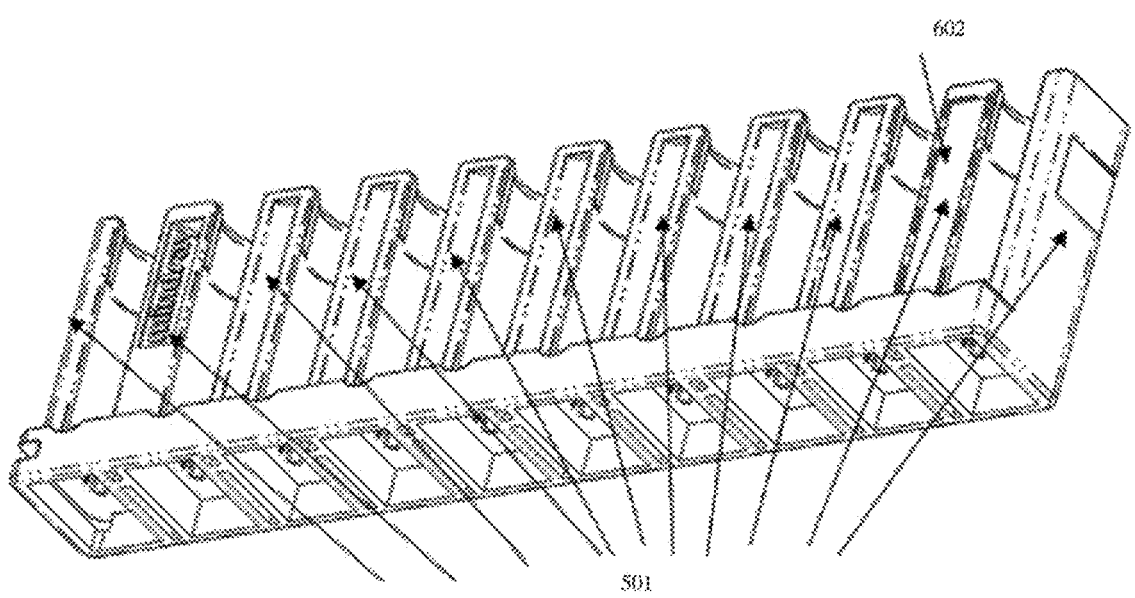
FIG. 5 is a schematic diagram of a fixed position of a readable and writable label in a test tube rack provided by an embodiment of the disclosure.

The RFID tag is fixed at any selected position 501 shown in FIG. 5, or may also be fixed to a back side, a lateral side or a top side of the test tube rack.

As shown in FIG. 6, the test tube rack 601 is provided with a bar code 603 adhered at a position 602. The bar code 603 is a graphic identifier in which multiple black bars and blanks with different widths are arranged according to a certain coding rule to express a set of information. When fixing the RFID tag, the RFID tag may also be fixed in the position 603 in FIG. 6 where the bar code label is adhered, and then, the test position of the existing test tube rack is kept, to improve the compatibility of the analysis system that scans the label on the test tube rack.

While the RFID tag is fixed on the test tube rack, a bar code label may be adhered on the test tube rack at the same time. Then, when the test tube rack is tested, the RFID tag and the bar code label can be detected at the same time.

When the RFID tag and the bar code label are fixed on the test tube rack, both the RFID tag and the bar code label may be located at the position where the bar code label is adhered, and the bar code label is adhered on the RFID tag.

When fixing the RFID tag, the test tube rack may be provided with a recess body (i.e., a recess), and the RFID tag and the bar code label are arranged in the recess body, such that the thickened portion forming by adhering the RFID tag and the bar code label together will not protrude from the surface of the test tube rack, thereby preventing the wear of the bar code on the bar code label during the movement of the test tube rack. As shown in FIG. 7, the recess body 701 may be arranged on the back side 702 of the test tube rack, wherein the position 703 and the position 704 are respectively at the back side of the recess body and the lateral side of the recess body.

The RFID tag itself is a circuit board. The circuit board is provided with a controller, and therefore the RFID tag has locally concave portions as seen from the surface. The locally concave portions will cause the bar code on the bar code label to partially protrude, so that the distance between the lines on the bar code is changed.

For the RFID tag with a convex portion, a recess with a proper size may be provided on the test tube rack according to the position of the convex portion of the RFID tag, and when the RFID tag is adhered, the convex portion on the RFID tag is hidden in the recess, such that the RFID tag has a flat appearance. The bar code label is adhered to the RFID tag.

For the RFID tag with a convex portion, the convex portion may be arranged on two sides of the RFID tag when the RFID tag is produced, and the bar code label is adhered at the middle position of the RFID tag where is not provided with a convex portion, so as to enable the bar code to be adhered at a position without a convex portion of the RFID tag, such that there is no protrusion on the surface of the bar code label.

By hiding the convex portion on the RFID tag in the recess, or by adhering the bar code label at the middle position of the RFID tag that is not provided with the convex portion, the bar code label adhered to the RFID tag has a flat surface, thereby preventing the reduction in bar code identification rate due to the change of distance between the lines on the bar code.

The storage data of the RFID tag includes a serial number, i.e., a test tube rack sequence number, to identify the test tube rack where the RFID tag is located, so as to distinguish different test tube racks by the test tube rack sequence number. For the RFID tag and the bar code label on the same test tube rack, the stored test tube rack sequence number may be the same as the code value of the bar code, so as to use the RFID tag and the bar code label to recognize that the test tube rack serial number is consistent with the code value.

The data in the RFID tag may also include test tube rack type information that characterizes the type of test tube rack. The types of test tube rack include ordinary test tube rack, test tube rack for reticulocyte (RET) count, test tube rack for slide smear, CRP test tube rack, test tube rack for quality control, test tube rack for calibration, etc. The ordinary test tube rack can hold various samples with different test modes. The RET test tube rack, the test tube rack for slide smear, the CRP test tube rack, the test tube rack for quality control, and the test tube rack for calibration carry samples with corresponding test items. For example, the samples carried by the RET test tube rack are RET samples, and the samples carried by the test tube rack for slide smear are samples for slide smear.

The test tube rack sequence number and the test tube rack type information may be defined as bar code information, i.e., test tube rack information. The structure of the bar code information may, as shown in FIG. 8, use 22-bit code CODE128, and include three areas, each of which has a different value to represent different information. The information may be divided as shown in Table 1. The $1^{st}$ bit represents test tube rotation information, the $2^{nd}$ to $4^{th}$ bits represent the test tube rack type information, the $5^{th}$ to $19^{th}$ bits are reserved bits, and the 20th to 22nd bits represent the test tube rack sequence number.

TABLE 1

| Example of division of test tube rack information | | |
| --- | --- | --- |
| | Value | Type |
| $1^{st}$ Bit | 0 | Representing that the test tube is rotated (it means that the test tube will rotate while being scanned, such that the bar code can be scanned no matter how the test tube is placed) |
| | 1 | Representing that the test tube is not rotated |
| $2^{nd}$-$4^{th}$ Bits | 000 | Ordinary test tube rack |
| | 001 | Test tube rack for CRP |
| | 002 | Test tube rack for slide smear |
| | 003 | Test tube rack for RET |
| | 004 | Test tube rack for glycohemoglobin |
| | 005 | Test tube rack for blood routine |
| | 006 | Test tube rack for flow cytometry |
| | 007 | Test tube rack for hemagglutination |
| | 008 | Test tube rack for blood routine test quality control |
| | 009 | Test tube rack for CRP quality control |
| | 010 | Test tube rack for CRP calibration |
| | 011 | Test tube rack for probe liquid |
| $5^{th}$-$19^{th}$ Bits | 000000000000000 | Reserved byte |
| $19^{th}$-$22^{nd}$ Bits | 001-999 | Representing the test tube rack sequence number |

Hereafter, with the analysis system shown in FIG. 3 as an example, the test tube rack dispatching method provided by an embodiment of the disclosure will be described.

As shown in FIG. 3, the analysis system comprises test devices 101-11N, test platforms 111 to 11N, a sample conveying mechanism 120, a first scanning mechanism 130, a loading platform 140, a second scanning mechanism 150, a third scanning mechanism 160, and an unloading platform 170. The test platform 111 comprises a temporary loading storage region 111-1, a sample feeding track 111-2, and a temporary unloading storage region 111-3. The test platform 11N comprises: a temporary loading storage region 11N-1, a sample feeding track 11N-2, and a temporary unloading storage region 11N-3.

Taking the test platform 111 as an example, two ends of the sample feeding track 111-2 are respectively connected to the temporary loading storage region 111-1 and the temporary unloading storage region 111-3, the end of the temporary loading storage region 111-1 that is not connected to the sample feeding track 111-2 is connected to the sample conveying mechanism 120, and the end of the temporary unloading storage region 111-3 that is not connected to the sample feeding track 111-2 is connected to the sample conveying mechanism 120. The sample feeding track 111-2, the temporary loading storage region 111-1 and the temporary unloading storage region 111-3 constitute the test platform 111 configured to cooperate with the test device 101. One end of the sample conveying mechanism 120 is connected to the loading platform 140, and the other end thereof is connected to the unloading platform 170.

The loading platform 140 is configured to carry a test tube rack to be tested and can simultaneously carry multiple test tube racks. The test tube rack may be transferred to the loading platform 140 by an external transport structure (not shown).

The first scanning mechanism 130 scans the readable label of the test tube rack in the analysis system, so as to obtain test mode information corresponding to the test tube rack.

The sample conveying mechanism 120 is configured to transfer the test tube rack from the loading platform 140 to the test platforms 111 to 11N corresponding to the test mode information. The test tube rack can be transferred from the loading platform 140 to the sample conveying mechanism 120.

Here, the temporary loading storage regions 111-1 to 11N-1, the sample feeding tracks 111-2 to 111-N and the temporary unloading storage regions 111-3 to 11N-3 are respectively described with the temporary loading storage region 111-1, the sample feeding track 111-2 and the temporary unloading storage region 111-3 as an example.

The temporary loading storage region 111-1 is configured to temporarily store the test tube rack, so as to wait for being tested by the test device 101. The test tube rack can be transferred from the sample conveying mechanism 120 to the temporary loading storage region 111-1, and the test tube rack is delivered to the sample feeding track 111-2.

The sample feeding track 111-2 is configured to place the test tube rack being tested. The test tube rack can be transferred from the temporary loading storage region 111-1 or the temporary unloading storage region 111-3 to the sample feeding track 111-2.

The temporary unloading storage region 111-3 is configured to place the test tube rack that has been tested by the corresponding device. The test tube rack can be transferred from the sample feeding track 111-2 to the temporary unloading storage region 111-3 and delivered to the sample conveying mechanism 120 or the sample feeding track 111-2.

The test devices 101-10N are configured to respectively aspirate and test samples placed on the test tube rack on the corresponding sample feeding tracks 111-2 to 11N-2. Multiple test tubes can be placed side by side on the test tube rack, and the samples being tested are placed in the test tubes.

The unloading platform 170 is configured to receive the tested test tube rack conveyed by the sample conveying mechanism 120.

As shown in FIG. 3, the first scanning mechanism 130 comprises: a first scanner 130-1 arranged on the loading platform, second scanners 130-21 to 130-2N arranged in the temporary unloading storage regions 111-2 to 11N-2 or arranged at positions on the sample conveying mechanism 120 that correspond to the temporary unloading storage regions 111-2 to 11N-2, and a third scanner 130-3 arranged on the loading platform 170.

As shown in FIG. 3, the analysis system further comprises a second scanning mechanism 150 arranged on the loading platform 140, and third scanning mechanisms 160-1 to 160-N electrically connected to the test devices 101 to 10N.

In the embodiment of the disclosure, the first scanning mechanism 130 can read data in the readable and writable label on the test tube rack, and the second scanning mechanism 150 and the third scanning mechanisms 160-1 to 160-N can write data to the readable and writable label on the test tube rack.

The second scanning mechanism 150 writes the test mode information corresponding to the test tube rack placed on the loading platform 140 to the readable and writable label of the test tube rack. Before writing the test mode information to the readable and writable label of the test tube rack, the second scanning mechanism 150 clears information in the readable and writable label of the test tube rack, except for test tube rack information.

The first scanner 130-1 scans the readable and writable label of the test tube rack placed on the loading platform 140 to read the test mode information corresponding to the test tube rack, and then the sample conveying mechanism 120 transfers the test tube rack from the loading platform 140 to any test device 10$n$ in the test platforms 111 to 11N corresponding to the test mode information.

For the test device 10$n$, samples on the test tube rack are tested to obtain test data, and the third scanner 160$n$ connected to the test device 10$n$ writes the test data to the readable and writable label on the test tube rack. Before the test tube rack is delivered out of the analysis system, the third scanning mechanism 160$n$ writes an additional test mode information corresponding to an additional test item to the readable and writable label of the test tube rack; and then, the sample conveying mechanism 120 can deliver the test tube rack to a test platform corresponding to the additional test item, so as to test a sample on the test tube rack by a corresponding test device.

The second scanner 130-2$n$ scans the readable and writable label of the test tube rack that has been tested by the test device 10$n$, so as to read whether there is a remaining second test item in the test mode information corresponding to the test tube rack; and then, the sample conveying mechanism 120 transfers, according to the reading result, the test tube rack from the temporary unloading storage region 11$n$-3 to the second test platform corresponding to the second test item or out of the analysis system.

When the test device 10$n$ determines that the corresponding test item is a retest item according to the test data, the temporary unloading storage region 11$n$-3 allows the test tube rack thereon to return to the sample feeding track 11$n$-2 connected thereto or transfers same to the sample conveying mechanism 120, the sample conveying mechanism 120 transfers the test tube rack to the temporary loading storage region Un-i$x$) 1 of the same test platform 11$n$, and the temporary loading storage region 11$n$-1 transfers the test tube rack to the sample feeding track 11$n$-2 so as to retest a sample on the test tube rack by the test device 10$n$.

The unloading platform 170 receives the tested test tube rack conveyed by the sample conveying mechanism 120; and the third scanner 130-3 scans the test tube rack on the unloading platform 170 so as to read the test data and the test mode information in the readable and writable label, and sends the test data and the test mode information to a display.

It should be noted that an actuation claw is provided between any two interconnected components of the loading platform 140, the sample conveying mechanism 120, the temporary loading storage region 11$n$-1, the sample feeding track 11$n$-2, the temporary unloading storage region 11$n$-3, and the unloading platform 170. The actuation claw may be driven by a stepping motor to push the test tube rack, so as to push the test tube rack from one component to another component. The actuation claw moves a distance of the width of the test tube rack in one movement, thereby pushing one test tube rack at a time.

Based on the analysis system shown in FIG. 3, when the test tube rack placed on the loading platform passes through an outlet of the loading platform, an RFID card reader (i.e., a scanner) reads the test tube rack type number which characterizes the test tube rack type and is preset in an RFID tag on the test tube rack, and the pipeline analysis system allocates, combined with the test tube rack type number, the test tube rack to the corresponding track of the sample conveying mechanism. If the test tube rack is an ordinary test tube rack, the test tube rack can be first transferred to a track for blood routine test instrument. If the test tube rack is a test tube rack for slide smear, the test tube rack is directly delivered to a track for slide smear machine, with the other instrument tracks being skipped.

The corresponding position where the sample conveying mechanism is connected to the temporary unloading storage region, i.e., the outlet of each track, may also be provided with an RFID card reader. When the test tube rack is delivered out of a track, the test tube rack serial number in the RFID tag will be automatically obtained to confirm that the test tube rack being dispatched is consistent with the currently output test tube rack, so as to prevent confusion of test tube rack dispatching due to human factors.

For example, five test tube racks are conveyed to the track 3 by the sample conveying mechanism. If the second test tube rack is removed manually when the five test tube racks are conveyed to the track 4, then there are four test tube racks remained on the track 4, which is not as expected. If there is a sample to be subjected to slide smear in the original third test tube rack, if the testing continues, the sample conveying mechanism may consider the fourth test tube rack to be the third test tube rack and delivers the wrong test tube rack, resulting in problems such as missing sample testing results and no retesting. In the related art, for error control, once it is found that the number of racks in the track 4 is not as expected, the sample conveying mechanism stops conveying test tube racks, thereby affecting the conveying efficiency of the whole analysis system.

According to the analysis system and the test tube rack dispatching method provided by the embodiments of the disclosure, providing a scanner at the outlet of the temporary unloading storage region can avoid the above problems. The scanner arranged on the temporary unloading storage region or arranged at a position of the sample conveying mechanism corresponding to the temporary unloading storage region can read the test tube rack information in the RFID tag of the test tube rack, and obtain the identity information and the test mode information of the test tube rack, so as to determine which test tube rack is removed or changed in order and to determine which test platform the test tube rack to be transferred needs to be transferred, so as to ensure the accurate transfer path to prevent the delivery of a wrong sample rack, thereby improving the conveying efficiency of the pipeline analysis system.

In an embodiment of the disclosure, the information may be read based on a RFID detection method by a scanner, or the information may be read by means of a bar code scanner, which will not be limited in the embodiment of the disclosure.

The test tube rack enters the sample feeding track of the test device, the test device can read the RFID tag to obtain the test tube rack information of the test tube rack and obtain, according to the test tube rack information, test items of the samples from a data management system of the analysis system, so as to perform testing combined with the performance of the test device.

After each test device completes the test of one sample, information related to the sample, such as the test result, may be written to the RFID tag on the test tube rack by a scanner.

When the test tube rack enters the loading platform, the contents, except for the test tube rack information, stored in the RFID tag are cleared to prevent the information from being misidentified.

When the test tube rack is directly manually placed in front of the test device, the contents stored in the RFID tag may also be cleared by the third scanning mechanism electrically connected to the test device.

The data stored in the RFID tag of the test tube rack may be as shown in Table 2:

TABLE 2

| Example of data stored in RFID tag | | | | | |
|---|---|---|---|---|---|
| Storage type | Content 1 | Content 2 | Content 3 | Content 4 | Content 5 |
| Property of test tube rack | Test tube rack ID | | | | |
| | Test tube rack type | | | | |
| | Time | Loading time | Unloading time | | |
| | Refresh mark | | | | |
| Instrument information | Instrument-1 | Number of written samples | Writing time | | |
| | Instrument-2 | Number of written samples | Writing time | | |
| | Instrument-3 | Number of written samples | Writing time | | |
| | Instrument-4 | Number of written samples | Writing time | | |
| | Instrument-n (n < 20) | Number of written samples | Writing time | | |
| Sample information | Test tube position-1 | Sample bar code-1 | Test mode | Remaining mode | Test instrument |
| | Test tube position-2 | Sample bar code-2 | Test mode | Remaining mode | Test instrument |
| | Test tube position-3 | Sample bar code-3 | Test mode | Remaining mode | Test instrument |
| | Test tube position-4 | Sample bar code-4 | Test mode | Remaining mode | Test instrument |
| | Test tube position-5 | Sample bar code-5 | Test mode | Remaining mode | Test instrument |
| | Test tube position-6 | Sample bar code-6 | Test mode | Remaining mode | Test instrument |
| | Test tube position-7 | Sample bar code-7 | Test mode | Remaining mode | Test instrument |
| | Test tube position-8 | Sample bar code-8 | Test mode | Remaining mode | Test instrument |
| | Test tube position-9 | Sample bar code-9 | Test mode | Remaining mode | Test instrument |
| | Test tube position-10 | Sample bar code-10 | Test mode | Remaining mode | Test instrument |

When the information of the samples of the test tube rack are stored in the RFID tag of the test tube rack, the test tube rack is managed as a whole, such that the analysis system can perform a distributed management. The distributed management of the analysis system specifically includes:

1. Dispatching According to the Test Tube Rack Type.

When the test tube rack type is determined to be a specific mode, the system selects an instrument (i.e., a test device) according to the specific mode, and dispatches the test tube rack to the respective track. For example, the CRP test tube rack will be directly delivered to the CRP track; the test tube rack for slide smear is directly delivered to the track for slide smear machine; and if the rack is an ordinary rack, it is firstly dispatched to the analyzer track.

2. Dispatching According to the Test Items of the Samples Stored on the Test Tube Rack.

When the samples on the test tube rack have different test modes (i.e., test items), the test tube rack may be dispatched, in combination with the different test modes, to the instruments and be tested in an priority order of blood routine test>blood routine retest>CRP>slide smear>glycohemoglobin.

3. Dispatching According to the Remaining Modes of the Samples Stored on the Test Tube Rack.

When there is a remaining mode of a sample on the test tube rack, the test tube rack may be dispatched to the respective instrument and be tested according to the remaining mode. When the samples on the test tube rack have different remaining modes, the test tube rack may be dispatched, in combination with the different remaining modes, to the instruments and be tested in an priority order of blood routine test>blood routine retest>CRP>slide smear>glycohemoglobin.

4. Displaying According to the Remaining Modes of the Samples Stored on the Test Tube Rack.

After test tube racks have been tested, all the test tube racks and samples can be collected on the unloading platform.

In the related art, the user will confirm the samples one by one before the sample collection is completed, such as confirm whether there is an unchecked mode, a remaining mode, a bar code scanning failure, no result, etc. These samples need to be picked out manually and then confirmed or retested. At present, the more concerned problem is that it is very difficult for the user to find a sample among a large number of samples.

However, in the disclosure, by scanning the RFID tag of the test tube rack on the unloading platform, the analysis system can obtain the information of all the samples on the test tube rack and displays same on a display interface, such that the user can conveniently and rapidly find the sample of a certain characteristic. Table 3 is an example of the information of a displayed sample.

TABLE 3

| Example of the information of a displayed sample | | | | | | | |
|---|---|---|---|---|---|---|---|
| Test tube rack No. - test tube position | Se-quence number | Sample bar code | Not access-ible to code | Un-obtained mode | Un-tested mode | no result | Critical value |
| 1-1 | 123 | 180009292 | | | | | |
| 1-2 | | | | | | | |
| 1-3 | | | Invalid | √ | | | |
| 1-4 | | | | | | | |
| 1-5 | | | | | | √ | |

TABLE 3-continued

| Example of the information of a displayed sample | | | | | | | |
|---|---|---|---|---|---|---|---|
| Test tube rack No. - test tube position | Se-quence number | Sample bar code | Not access-ible to code | Un-obtained mode | Un-tested mode | no result | Critical value |
| 1-6 | 213 | 124332125 | | | CRP | | |
| 1-7 | 222 | 180012324 | | | | | |
| 1-8 | | | | | | | |
| 1-9 | 324 | 431432566 | | | ESR | | |
| 1-10 | | | | | | | |

Here, the display interface may display the information stored in the RFID chip of the test tube rack as a whole by means of tables, graphics, etc., and the displayed content may be set according to the actual needs of the user.

In the embodiments of the disclosure, if implemented in the form of a software function module and sold or used as an independent product, the above test tube rack dispatching method may also be stored in a computer readable storage medium. Based on such an understanding, the technical solutions in the embodiments of the disclosure essentially, or the part contributing to the prior art may be implemented in a form of a software product. The computer software product is stored in a storage medium, comprising several instructions for instructing a computer device (which may be a personal computer, a server, or a network device, etc.) to perform all or some of the methods in the embodiments of the disclosure. The foregoing storage medium includes a USB flash disk, a mobile hard disk drive, a read only memory (ROM), a magnetic disk, a compact disk, or various media that can store program codes. In this way, the embodiments of the disclosure are not limited to any specific combination of hardware and software.

It should be understood that "one embodiment" or "an embodiment" mentioned throughout the specification means that a specific feature, structure, or characteristic related to the embodiment is included in at least one embodiment of the disclosure. Therefore, "in one embodiment" or "in an optional embodiment" throughout the specification does not necessarily refer to the same embodiment. Furthermore, these specific features, structures, or characteristics may be combined in one or more embodiments in any suitable manner. It should be understood that, in various embodiments of the disclosure, the sequence numbers of the foregoing processes does not mean the order of execution, and the execution order of the processes should be determined by the function and internal logic thereof and should not constitute any limitation to the implementation process of the embodiments of the disclosure. The sequence numbers of the foregoing embodiments of the disclosure are merely for description, and do not represent the superiority of the embodiments.

It should be noted that, the terms "comprise", "include" or any other variants thereof herein are intended to cover non-exclusive inclusion, such that a process, method, object or apparatus including a series of elements not only includes those elements, but also includes other elements that are not explicitly listed, or elements inherent to the process, method, object or apparatus. In the absence of more restrictions, the element defined by the phrase "comprising a/an . . . " does not exclude the presence of a further identical element in the process, method, object, or apparatus which comprises the element.

In several embodiments provided in the present disclosure, it is to be understood that the disclosed devices and methods may be implemented in other ways. The device embodiments described above are merely schematic, for example, the unit division is merely a logic function division, and in actual implementation, there may be other division methods, for example, multiple units or assemblies can be combined or integrated into another system, or some features can be omitted or not implemented. In addition, the mutual coupling or direct coupling or communication connection between the components as shown or discussed may be indirect coupling or communication connection through some interfaces, devices or units, and may be in electrical, mechanical or other forms.

The units described above as separate parts may or may not be physically separate, and the parts displayed as units may or may not be physical units. They may be located in one place or distributed on multiple network units. Some or all of the units may be selected according to actual needs to achieve the purpose of the solution of this embodiment.

In addition, the functional units in the embodiments of the disclosure may all be integrated into one processing unit, or each unit may be individually used as a unit, or two or more units may be integrated into one unit. The integrated unit described above may be implemented in the form of hardware or may be implemented in the form of hardware plus software functional units.

Those of ordinary skill in the art would have understood that all or some steps in the above method embodiments may be implemented by hardware associated with program instructions, the foregoing program may be stored in a computer readable storage medium, when the program is executed, the steps comprising the above method embodiments are performed, and the foregoing storage medium includes a mobile storage device, a read-only memory (ROM), a magnetic disk or an optical disk and other media which can store program codes.

Alternatively, if implemented in the form of a software function module and sold or used as an independent product, the above integrated unit of the disclosure may also be stored in a computer readable storage medium. Based on such an understanding, the technical solutions in the embodiments of the disclosure essentially, or the part contributing to the prior art may be implemented in a form of a software product. The computer software product is stored in a storage medium, comprising several instructions for instructing a computer device (which may be a personal computer, a server, or a network device, etc.) to perform all or some of the methods in the embodiments of the disclosure. The foregoing storage medium includes a mobile storage device, a ROM, a magnetic disk or an optical disk and other media which can store program codes.

The above descriptions are merely specific embodiments of the disclosure, but the protection scope of the disclosure is not limited thereto. Changes or substitutions readily figured out by those skilled in the art within the technical scope disclosed in the disclosure shall fall within the protection scope of the disclosure. Therefore, the protection scope of the disclosure shall be subject to the protection scope of the claims.

What is claimed is:

1. A test tube rack dispatching method applied to an analysis system, which comprises a control device, a scanning mechanism, an input device, a loading platform for placing at least two test tube racks, a sample conveying mechanism, at least two test devices and at least two test platforms corresponding to the at least two test devices, the sample conveying mechanism being connected to the at least two test platforms, wherein the method is performed by the control device, and comprises: for each of the at least two test tube racks, reading, through the scanning mechanism, type information and a test tube rack sequence number of the test tube rack from a radio frequency identification (RFID) label of the test tube rack, wherein information in the RFID label of the test tube rack comprises the test tube rack sequence number and the type information of the test tube rack, the type information of the test tube rack is a specific type or a non-specific type; and determining whether the type information of the test tube rack is the specific type or the non-specific type, in response to determining that the type information of the test tube rack is the specific type, writing, into the RFID label of the test tube rack, a test item corresponding to the specific type as test mode information corresponding to the test tube rack, wherein the test item corresponding to the specific type is to be dispensed to all samples on the test tube rack; and in response to determining that the type information of the test tube rack is the non-specific type, obtaining, based on the test tube rack sequence number of the test tube rack, test item(s) to be dispensed to each sample on the test tube rack that is (are) inputted by a user through the input device, and writing, into the RFID label of the test tube rack, the test item(s) inputted for each sample as test mode information corresponding to the test tube rack; or in response to determining that the type information is the non-specific type, obtaining, through the scanning mechanism or another scanning mechanism, sample serial numbers of samples on the test tube rack, determining test item(s) to be dispensed to each sample on the test tube rack according to the respective sample serial number, determining test mode information corresponding to the test tube rack according to the test item(s) determined for each sample, and writing, into the RFID label of the test tube rack, the determined test mode information corresponding to the test tube rack;

wherein the test mode information is used by the analysis system to dispatch the test tube rack to a test device corresponding to the test mode information so as to dispense corresponding test item(s) to each sample on the test tube rack;

scanning, through the scanning mechanism, the RFID label of the test tube rack placed in the analysis system, so as to read the test mode information corresponding to the test tube rack; and dispatching, through the sample conveying mechanism, the test tube rack to the test platform corresponding to the test mode information, so as to dispense corresponding test item(s) to each sample on the test tube rack by the test device corresponding to the test platform.

2. The method of claim 1, wherein the RFID label comprises at least test tube rack information; and before writing the test mode information into the RFID label of the test tube rack on the loading platform, the method further comprises:

clearing other information from the RFID label of the test tube rack than the test tube rack information.

3. The method of claim 1, wherein the at least two test devices comprise a first test device and a second test device, and the at least two test platforms comprise a first test platform corresponding to the first test device and a second test platform corresponding to the second test device; and the method further comprises:

delivering samples on the test tube rack placed on the first test platform into the first test device;

testing the samples for a first test item on the test tube rack by the first test device to obtain test data; and writing the test data into the RFID label of the test tube rack.

4. The method of claim 3, wherein the method further comprises:

scanning the RFID label of the test tube rack after being tested by the first test device so as to read a remaining second test item in the test mode information of the test tube rack; and transferring the test tube rack from the first test platform to the second test platform corresponding to the second test item by the sample conveying mechanism.

5. The method of claim 3, wherein the first test platform comprises a sample feeding track and a temporary unloading storage region; and the method further comprises:

determining whether the first test item corresponding to the first test device is a retest item according to the test data;

if the first test item is a retest item, allowing the sample feeding track to move in a reverse direction so as to retest the sample on the test tube rack by the first test device; and if the first test item is not a retest item, delivering the test tube rack to the temporary unloading storage region.

6. The method of claim 3, wherein the first test platform comprises a sample feeding track and a temporary unloading storage region; and the method further comprises:

delivering the test tube rack, which has been tested by the first test device, to the temporary unloading storage region;

determining, according to the test data, that the first test item corresponding to the first test device is a retest item; and delivering the test tube rack located in the temporary unloading storage region to the sample feeding track, so as to move the test tube rack to the first test device to retest the sample.

7. The method of claim 6, wherein said delivering the test tube rack located in the temporary unloading storage region to the sample feeding track comprises:

if there is no other test tube rack placed on a side of the sample feeding track that is close to the test tube rack, allowing the test tube rack located in the temporary unloading storage region to return to the sample feeding track, so as to move the test tube rack to the first test device to retest the sample; or wherein the first test platform further comprises a temporary loading storage region;

and said delivering the test tube rack located in the temporary unloading storage region to the sample feeding track comprises:

delivering the test tube rack located in the temporary unloading storage region to the sample conveying mechanism;

delivering the test tube rack to the temporary loading storage region by the sample conveying mechanism; and delivering the test tube rack on the temporary loading storage region to the sample feeding track, so as to move the test tube rack to the first test device to retest the sample.

8. The method of claim 3, wherein before the test tube rack is delivered out of the analysis system, the method further comprises:

writing additional test mode information corresponding to an additional test item into the RFID label of the test tube rack; and delivering the test tube rack to a third test platform corresponding to the additional test item by the sample conveying mechanism, so as to test the sample on the test tube rack by a third test device corresponding to the third test platform.

9. The method of claim 3, wherein the analysis system further comprises an unloading platform; and the method further comprises:

after the test, delivering the test tube rack to the unloading platform;

scanning the RFID label of the test tube rack, so as to read the test data and the test mode information in the RFID label; and outputting the test data and the test mode information to a display interface.

10. The method of claim 1, wherein the test tube rack is further provided with an information code label accessible by a computer or a display apparatus; and the method further comprises:

scanning the information code label of the test tube rack accessible by the computer or the display apparatus, so as to obtain a test tube rack sequence number in the information code label; and outputting prompt information if the test tube rack sequence number in the information code label accessible by the computer or the display apparatus is different from the test tube rack sequence number in the RFID label.

11. The method of claim 1, wherein each specific type corresponds to a respective test item.

12. An analysis system, comprising at least two test devices, at least two test platforms corresponding to the at least two test devices, an input device, a loading platform for placing at least two test tube racks, a sample conveying mechanism, a scanning mechanism, and a control device; the sample conveying mechanism being connected to the at least two test platforms; wherein for each of the at least two test tube racks, the scanning mechanism is configured to read type information and a test tube rack sequence number of the test tube rack from a radio frequency identification (RFID) label of the test tube rack, wherein information in the RFID label of the test tube rack comprises the test tube rack sequence number and the type information of the test tube rack, the type information of the test tube rack is a specific type or a non-specific type;

the control device is configured to: determine whether the type information of the test tube rack is the specific type or the non-specific type, in response to determining that the type information of the test tube rack is the specific type, write, into the RFID label of the test tube rack, a test item corresponding to the specific type as test mode information corresponding to the test tube rack, wherein the test item corresponding to the specific type is to be dispensed to all samples on the test tube rack; and in response to determining that the type information of the test tube rack is the non-specific type, obtain, based on the test tube rack sequence number of the test tube rack, test item(s) to be dispensed to each sample on the test tube rack that is (are) inputted by a user through the input device, and write, into the RFID label of the test tube rack, the test item(s) inputted for each sample as test mode information corresponding to the test tube rack; or in response to determining that the type information is the non-specific type, obtain, through the scanning mechanism or another scanning mechanism, sample serial numbers of samples on the test tube rack, determine test item(s) to be dispensed to each sample on the test tube rack according to the respective sample serial number, determine test mode information corresponding to the test tube rack according to the test item(s) determined for each sample, and write, into the RFID label of the test tube rack, the determined test mode information corresponding to the test tube rack;

wherein the test mode information is used by the analysis system to dispatch the test tube rack to a test device corresponding to the test mode information so as to dispense corresponding test item(s) to each sample on the test tube rack;

the scanning mechanism is further configured to scan the RFID of the test tube rack placed in the analysis system so as to read the test mode information corresponding to the test tube rack; and the sample conveying mechanism is configured to dispatch the test tube rack to the test platform corresponding to the test mode information so as to dispense corresponding test item(s) to each sample on the test tube rack by the test device corresponding to the test platform.

13. The analysis system of claim 12, wherein the scanning mechanism comprises a first scanner provided on the loading platform, and the first scanner is configured to scan the RFID label of the test tube rack placed on the loading platform so as to read the test mode information corresponding to the test tube rack; and the sample conveying mechanism is further configured to transfer the test tube rack from the loading platform to the test platform corresponding to the test mode information.

14. The analysis system of claim 13, wherein;
the scanning mechanism is further configured to, before writing the test mode information into the RFID label of the test tube rack, clear other information from the RFID label of the test tube rack than test tube rack information.

15. The analysis system of claim 12, wherein the at least two test devices comprise a first test device and a second test device, and the at least two test platform comprise a first test platform corresponding to the first test device and a second test platform corresponding to the second test device; and the analysis system further comprises a third scanning mechanism electrically connected to the first test device;

the first test platform is configured to deliver samples on the test tube rack into the first test device;

the first test device is configured to test the samples on the test tube rack to obtain test data; and the third scanning mechanism is configured to write the test data into the RFID label on the test tube rack.

16. The analysis system of claim 15, wherein the first test platform comprises a sample feeding track and a temporary unloading storage region; the temporary unloading storage region is connected between the sample feeding track and the sample conveying mechanism; the scanning mechanism comprises a second scanner arranged in the temporary unloading storage region or arranged on the sample conveying mechanism at a position corresponding to the temporary unloading storage region;

the second scanner is configured to scan the RFID label of the test tube rack after being tested by the first test device, so as to read whether there is a remaining second test item in the test mode information corresponding to the test tube rack; and the sample conveying mechanism is configured to transfer, according to the reading result, the test tube rack from the temporary unloading storage region to the second test platform corresponding to the second test item or out of the analysis system.

17. The analysis system of claim 15, wherein the first test platform comprises a sample feeding track and a temporary unloading storage region, the temporary unloading storage region being connected between the sample feeding track and the sample conveying mechanism, wherein the sample feeding track is configured to deliver the test tube rack to the temporary unloading storage region after the sample on the test tube rack is tested;

the first test device is configured to determine, according to the test data, that a first test item corresponding to the first test device is a retest item; and the temporary unloading storage region is configured to deliver the test tube rack thereon to the sample feeding track or the sample conveying mechanism so as to move the test tube rack to the first test device to retest the sample.

18. The analysis system of claim 15, wherein the third scanning mechanism is further configured to, before the test tube rack is delivered out of the analysis system, write additional test mode information corresponding to an additional test item into the RFID label of the test tube rack; and the sample conveying mechanism is configured to deliver the test tube rack to a third test platform corresponding to the additional test item so as to test the sample on the test tube rack by a third test device corresponding to the third test platform.

19. The analysis system of claim 15, further comprising a display and an unloading platform, wherein the unloading platform is connected to the sample conveying mechanism, and accordingly, the scanning mechanism comprises a third scanner arranged on the unloading platform;

the unloading platform is configured to receive the tested test tube rack conveyed by the sample conveying mechanism; and the third scanner is configured to scan the test tube rack on the unloading platform so as to read the test data and the test mode information in the RFID label, and output the test data and the test mode information to the display.

20. The analysis system of claim 12, further comprising a bar code scanning mechanism and a prompt apparatus, wherein the bar code scanning mechanism is configured to scan an information code label of the test tube rack accessible by a computer or a display apparatus, so as to obtain a test tube rack sequence number in the information code label accessible by the computer or the display apparatus; and the prompt apparatus is configured to output prompt information if the test tube rack sequence number in the information code label accessible by the computer or the display apparatus is different from the test tube rack sequence number in the RFID label.

* * * * *